United States Patent [19]

Kuznicki et al.

[11] Patent Number: 5,208,006
[45] Date of Patent: May 4, 1993

[54] LARGE-PORED MOLECULAR SIEVES CONTAINING AT LEAST ONE OCTAHEDRAL SITE COMPRISING TITANIUM AND AT LEAST SILICON AS A TETRAHEDRAL SITE

[75] Inventors: Steven M. Kuznicki, Readington, N.J.; Kathleen A. Thrush, Easton, Pa.

[73] Assignee: Engelhard Corporation, Iselin, N.J.

[21] Appl. No.: 825,205

[22] Filed: Jan. 24, 1992

Related U.S. Application Data

[63] Continuation-in-part of Ser. No. 527,624, May 28, 1990, abandoned.

[51] Int. Cl.$^5$ .............................................. C01B 33/34
[52] U.S. Cl. .................................... 423/713; 502/60; 208/46; 208/119; 208/120; 208/136; 208/137; 210/681
[58] Field of Search ............... 423/305, 306, 277, 279, 423/326, 328, 329, 330, 713, 700; 502/214, 60; 208/46, 119, 120, 135, 136, 137; 210/681

[56] References Cited

U.S. PATENT DOCUMENTS

| | | | |
|---|---|---|---|
| 3,769,386 | 11/1973 | Rundell et al. | 423/328 |
| 4,707,345 | 11/1987 | Lok et al. | 423/326 |
| 4,738,837 | 4/1988 | Flanigan et al. | 423/306 |
| 4,793,984 | 12/1988 | Lok et al. | 423/306 |
| 4,853,202 | 8/1989 | Kuznicki | 423/326 |
| 4,891,197 | 1/1990 | Derovane et al. | 423/306 |
| 4,913,795 | 4/1990 | Valyocsik | 423/306 |
| 4,917,876 | 4/1990 | Lok et al. | 423/306 |
| 4,956,165 | 9/1990 | Lok et al. | 423/306 |
| 5,015,453 | 5/1991 | Chapman | 423/306 |

FOREIGN PATENT DOCUMENTS

WO89/01912  3/1989  PCT Int'l Appl. .................. 423/328

OTHER PUBLICATIONS

Selbin, et al. "Preparation of Gallium-Containing Molecular Sieves", J. Inorg. Nucl. Chem. 1961, vol. 20 pp. 222-228.

Primary Examiner—R. Bruce Breneman
Attorney, Agent, or Firm—Inez L. Moselle

[57] ABSTRACT

Crystalline molecular sieves having large pores are disclosed having at least one octahedrally coordinated site comprising titanium and at least tetrahedrally coordinated silicon in the framework.

Conversion of organic compounds and removal of ions from solutions are also disclosed.

55 Claims, No Drawings

LARGE-PORED MOLECULAR SIEVES CONTAINING AT LEAST ONE OCTAHEDRAL SITE COMPRISING TITANIUM AND AT LEAST SILICON AS A TETRAHEDRAL SITE

RELATED APPLICATIONS

This application is a continuation-in-part of U.S. Ser. No. 527,624 filed May 28, 1990, now abandoned.

BACKGROUND OF THE INVENTION

1. Field of the Invention

This invention relates to new crystalline molecular sieve zeolite compositions, having a pore size of from about 8 to at least 10 Angstrom units, containing at least titanium as an octahedral site in the framework structure; methods for preparing the same; uses thereof such as organic compound conversions therewith, especially hydrocarbon conversions, ion exchange applications, removal of metal ions from solutions thereof, removal of gases in both a selective and non-selective mode, including storage of the same; and removal of hydrocarbons from a non-hydrocarbon media, e.g., water. The novel materials of this invention possess a framework which contains octahedrally coordinated titanium alone or with at least one other metal in an octahedrally coordinated state and at least silicon in the framework in a tetrahedrally coordinated state.

2. Background of the Invention and Prior Art

Since the discovery by Milton and coworkers (U.S. Pat. No. 2,882,243 and U.S. Pat. No. 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degree of utility is the result of a unique combination of high surface area and uniform porosity dictated by the "framework" structure of the zeolite crystals coupled with the electrostatically charged sites induced, by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally exchangeable for other cations with different inherent properties. This offers wide latitude for modification of active sites whereby specific adsorbents and catalysts can be tailor-made for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055, 4,603,040 and U.S. Pat. No. 4,606,899, totally new aluminosilicate framework structures are being discovered at a negligible rate. Of particular importance to fundamental progress in the catalysis of relatively large hydrocarbon molecules, especially fluid cracking operations, is the fact that it has been a generation since the discovery of any new large pored aluminosilicate zeolite.

With slow progress in the discovery of new wide pored aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials. While progress of academic interest has been made from different approaches, little success has been achieved in discovering new wide pore molecular sieve zeolites.

It has been believed for a generation that phosphorus could be incorporated, to varying degrees, in zeolite type aluminosilicate frameworks. In the more recent past (JACS 104 pp. 1146 (1982); Proceedings of the 7th International Zeolite Conference, pp. 103–112, 1986) E. M. Flanigan and coworkers have demonstrated the preparation of pure aluminophosphate based molecular sieves of a wide variety of structures. However, the site inducing $Al^{+3}$ is essentially neutralized by the $P^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the molecular sieve research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of which suffer either from the site removing effect of incorporated $P^{+5}$ or the site diluting effect of incorporating effectively neutral tetrahedral +4 metals into an aluminosilicate type framework. As a result, extensive research by the molecular sieve research community has failed to demonstrate significant utility for any of these materials.

A series of zeolite-like "framework" silicates have been postulated, some of which have larger uniform pores than are observed for aluminosilicate zeolites. (W. M. Meier, Proceedings of the 7th International Zeolite Conference, pp. 13–22 (1986).) While this particular synthesis approach produces materials which, by definition, totally lack active, charged sites, back implementation after synthesis would not appear out of the question although little work appears in the open literature on this topic.

Another and most straightforward means of potentially generating new structures or qualitatively different sites than those induced by aluminum would be the direct substitution of some other charge inducing species for aluminum in zeolite-like structures. To date the most notably successful example of this approach appears to be boron in the case of ZSM-5 analogs, although iron has also been claimed in similar materials. (EPA 68,796 (1983), Taramasso et al; Proceedings of the 5th International Zeolite Conference; pp. 40–48 (1980)); J. W. Ball et al; Proceedings of the 7th International Zeolite Conference; pp. 137–144 (1986); U.S. Pat. No. 4,280,305 to Kouenhowen et al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titanium silicates under conditions similar to aluminosilicate zeolite formation was possible if the titanium was present as a "critical reagent" +III peroxo species.

While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego et al, Proceedings of 7th International Zeolite Conference, p. 129 (1986).) For all but one end member of this series of materials (denoted TS materials), the presented XRD patterns indicate phases too dense to be molecular sieves. In the case of the one questionable end member (denoted TS-26), the XRD pattern might possibly be interpreted as a small pored zeolite, although without additional supporting evidence, this appears extremely questionable.

A naturally occurring alkaline titanosilicate identified as "Zorite" was discovered in trace quantities on the Kola Peninsula in 1972 (A. N. Mer'kov et al; Zapiski Vses Mineralog. Obshch., pages 54–62 (1973)). The published XRD pattern was challenged and a proposed structure reported in a later article entitled "The OD Structure of Zorite", Sandomirskii et al, Sov. Phys. Crystallogr. 24 (6), Nov–Dec 1979, pages 686–693.

No further reports on "titanium zeolites" appeared in the open literature until 1983 when trace levels of tetrahedral Ti(IV) were reported in a ZSM-5 analog. (M. Taramasso et al; U.S. Pat. No. 4,410,501 (1983); G. perego et al; Proceedings of the 7th International Zeolite Conference; p. 129 (1986).) A similar claim appeared from researchers in mid-1985 (EPA 132,550 (1985).) More recently, the research community reported mixed aluminosilicate-titanium(IV) (EPA 179,876 (1985); EPA 181,884 (1985)) structures which, along with TAPO (EPA 121,232 (1985)) systems, appear to have no possibility of active titanium sites because of the titanium coordination. As such, their utility is highly questionable.

That charge bearing, exchangeable titanium silicates are possible is inferred not only from the existence of exchangeable alkali titanates and the early work disclosed in U.S. Pat. No. 3,329,481 on ill defined titanium silicates but also from the observation (S. M. Kuznicki et al; J. Phys. Chem.; 84; pp. 535–537 (1980)) of $TiO_4$-units in some modified zeolites.

David M. Chapman, in a speech before 11th North American Meeting of the Catalysis Society in Dearborn, Mich. (1989) gave a presentation wherein a titanium aluminosilicate gel was crystallized with Chapman claiming all the aluminum was segregated into analcime (an ultra-small pored aluminosilicate) and not incorporated into any titanium-bearing phase such as his observed analog of the mineral vinogradovite which was a pure titanium silicate. It is noted that vinogradovite, as found in nature, has been reported to contain aluminum. However, neither the synthetic analog of vinogradovite nor the mineral vinogradovite is a molecular sieve.

Chapman et al, Zeolites, 1990, Vol. 10, November/December, discloses small-pored titanium silicate materials including zorite.

Chapman, U.S. Pat. No. 5,015,453, discloses titanium silicate materials which are structurally different than the instant large pored materials.

A major breakthrough in the field of large pored titanium silicate molecular sieves is disclosed and claimed in U.S. Pat. No. 4,853,202. The crystalline titanium silicate large pored molecular sieve of said patent, hereafter designated ETS-10, contains no deliberately added alumina but may contain very minor amounts of alumina due to the presence of impurities.

A second breakthrough is disclosed and claimed in copending application Ser. No. 07/373,855, filed on Jun. 29, 1989, the entire disclosure of which is herein incorporated by reference. Said application relates to large-pored sieves with charged octahedral titanium and charged tetrahedral aluminum sites identified as ETAS-10.

SUMMARY OF THE INVENTION

The present invention relates to a new family of stable molecular sieves which result from:

(1) replacement of a portion (but not all) of the octahedral titanium in either ETS-10 or ETAS-10 with at least one other octahedral metal atom and/or (2) replacement of a portion (but not all) of the tetrahedral silicon in ETS-10 and ETAS-10 and/or replacement of all of or a portion of the aluminum in ETAS-10 with at least one other tetrahedral metal atom.

DETAILED DESCRIPTION OF THE INVENTION

These novel materials can be identified in terms of mole ratios of oxides as follows:

$$a\ (1.0\pm0.25)\ M_{2/n}O:XO_\alpha:dZO_\beta:0\text{–}100\ H_2O$$

wherein X is titanium or a mixture of titanium and at least one other octahedral framework atom; Z is silicon or silicon and at least one other tetrahedral framework atom; M is at least one cation of valence n; $\alpha$ is ½ the valence of X; $\beta$ is ½ the valence of Z; d is 2–200; a is equal to ½ the charge provided by the total of X and Z, with the proviso that when X is solely titanium, Z cannot be solely silicon or silicon plus aluminum.

In the above formula, X is titanium alone or a mixture of titanium and another metal selected from the group consisting of arsenic, cobalt, chromium, copper, iron, germanium, magnesium, manganese, molybdenum, niobium, nickel, antimony, tin, vanadium, yttrium, the actinides such as uranium, the lanthanides such as cerium, zinc, zirconium, hafnium and mixtures thereof; Z is silicon or silicon and another metal selected from the group consisting of aluminum, arsenic, bismuth, boron, beryllium, cobalt, chromium, copper, iron, gallium, germanium, indium, lead, magnesium, manganese, molybdenum, niobium, nickel, antimony, tin, titanium, vanadium, tungsten, zinc, and mixtures thereof with the proviso that Z cannot be silicon alone or a mixture of silicon and aluminum where X is titanium alone.

In order to account for charge balance, the total cations in the above equation is multiplied by a factor designated as "a" which is ½ the sum of the charges provided by the octahedral sites and the tetrahedral sites.

Since both the octahedral atoms X and the tetrahedral atoms Z can be a plurality of atoms, it is necessary to take into consideration both the moles and the valence of a particular metal atom in order to obtain proper charge balance.

For the octahedral sites X, this is accomplished by calculating the moles of each X having a particular valence and proceeding as follows:

(6 —the valence of each X) multiplied by its moles.

Thus, if X was 0.5 moles of titanium$^{+4}$ and 0.5 moles of chromium$^{+3}$, then the total charge contributed by both of the above octahedrally coordinated atoms would be:

For titanium $$(6-4) \times 0.5 = 1$$

For chromium $$(6-3) \times 0.5 = 1.5$$

Total charge from X = 1 + 1.5 = 2.5. Thus, its contribution to a is ½ of 2.5 or 1.25.

For the tetrahedral sites Z, this is accomplished by calculating the moles of each Z having a particular valence and proceeding as follows:

d multiplied by ( 4 −the valence of each Z) multiplied by its moles.

Similarly, if d was 0.5 moles of aluminum$^{+3}$ and 3.5 moles of silicon$^{+4}$, then the total charge contributed by both of the above tetrahedrally coordinated atoms would be For aluminum $$d(4-3) = d$$

For silicon $$d(4-4) = o$$

Total charge from Z = 0 + d = d. Thus, the contribution to "a" is ½ d.

DESCRIPTION OF THE MOST PREFERRED EMBODIMENTS

It is preferred that d is from 2–20 with 2–10 being particularly preferred. It is also preferred that M is a mixture of alkali metal cations in the as-synthesized materials, particularly sodium and potassium.

The atomic ratio of octahedral titanium to the total of any other octahedral metals should be from 99:1 to 1:10 and preferably from 3:1 to 1:2 and most preferably from 2:1 to 1:1.

The tetrahedral sites can be all silicon or a mixture of silicon and at least one other tetrahedral metal. Thus, silicon can be from 100% to 20% of the total tetrahedral metal atoms with 100% to 40% being preferred and 100% to 50% being particularly preferred.

The octahedral metals which can be associated with titanium are preferably zirconium, niobium, cerium, chromium, iron, lanthanum and hafnium and mixtures thereof.

The tetrahedral metals associated with silicon (if any) are preferably aluminum, gallium or mixtures thereof.

The following table will illustrate specific molecular sieves of this invention:

TABLE 1

| X | Z |
|---|---|
| Ti | Si + Ga |
| Ti | Si + Al + Ga |
| Ti + Ce | Si |
| Ti + Ce | Si + Al |
| Ti + Ce | Si + Ga |
| Ti + Ce | Si + Al + Ga |
| Ti + Zr | Si |
| Ti + Zr | Si + Al |

TABLE 1-continued

| X | Z |
|---|---|
| Ti + Zr | Si + Ga |
| Ti + Zr | Si + Al + Ga |
| Ti + Cr | Si |
| Ti + Cr | Si + Al |
| Ti + Cr | Si + Ga |
| Ti + Cr | Si + Al + Ga |
| Ti + Nb | Si |
| Ti + Nb | Si + Al |
| Ti + Nb | Si + Ga |
| Ti + Nb | Si + Al + Ga |
| Ti + Nb | Si + Nb |
| Ti + Nb | Si + Al + Nb |
| Ti + Nb | Si + Ga + Nb |
| Ti + Nb | Si + Al + Ga + Nb |
| Ti | Si + Nb |
| Ti | Si + Al + Nb |
| Ti | Si + Ga + Nb |
| Ti | Si + Al + Ga + Nb |
| Ti | Si + Nb |
| Ti | Si + Al + Nb |
| Ti | Si + Ga + Nb |
| Ti | Si + Al + Ga + Nb |
| Ti | Si + Fe |
| Ti | Si + Fe + Al |
| Ti + Zr + Ce | Si |
| Ti + Zr + Ce | Si + Al |
| Ti + Zr + Ce | Si + Ga |

The original cations M can be replaced at least in part with other cations by well known exchange techniques. Preferred replacing cations include hydrogen, ammonium, transition metals, rare earth, and mixtures thereof. The novel molecular sieve zeolites generally have a high degree of thermal stability of at least 350° C. or higher, thus rendering them effective for use in high temperature processes.

Members of the novel family of molecular sieve zeolites have a crystalline structure and an X-ray powder diffraction pattern substantially the same as ETAS-10 or ETS-10 and contain the following significant lines:

TABLE 2

| XRD POWDER PATTERN OF NOVEL MOLECULAR SIEVES (0–40° 2 theta) | |
|---|---|
| SIGNIFICANT d-SPACING (ANGS.) | I/I° |
| 15.57 ± 2.0 | W-M |
| 7.20 ± 1.05 (optional) | W-M |
| 4.41 − .05 + 0.25 | W-M |
| 3.60 − .10 + 0.40 | VS |
| 3.28 − .05 + .25 | M-S |

In the above table,
VS = 100
S = 40–60
M = 20–40
W = 5–20

The above values and values later mentioned were collected using standard techniques on a Phillips APD3720 diffractometer equipped with a theta compensator. The theta compensator maintains a constant area of illumination on the sample, so X-ray intensities obtained from a theta compensated unit are not directly comparable to those of a non-compensated unit. Thus, all values mentioned in the specification and claims were determined by said theta compensated X-ray equipment. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 I/I$_o$, where I$_o$ is the intensity of the strongest line or peak, and d (obs.), the interplanar spacing in A, corresponding to the recorded lines, were calculated. It should be understood that this X-ray diffraction pattern is characteristic of all the compositions. Ion-exchange of the sodium ions and potassium ions with cations reveals substantially the same pattern with some minor shifts in interplanar spacing and variation in relative intensities. Other minor variations can occur depending on the ratio of the X to Z of a particular sample, the various metals in the framework, as well as if it had been subjected to thermal treatment.

The novel molecular sieves may be prepared from a reaction mixture containing a source of titanium or titanium and at least one other metal capable of being octahedrally coordinated and also containing a source of silicon or silicon and at least one other metal capable of being tetrahedrally coordinated in the framework structure, a source of alkalinity such as an alkali or alkaline earth metal hydroxide, water and, optionally, an alkali or alkaline earth metal salt having a composition in terms of mole ratios falling within the following ranges

TABLE 3

|  | Broad | Preferred | Most Preferred |
|---|---|---|---|
| Z/X | 1-200 | 2-100 | 2-20 |
| H$_2$O/Z | 2-100 | 5-50 | 10-35 |
| M/nX | 2-100 | 4-50 | 5-20 | wherein M indicates the cations of valence n derived from the alkali or earth metal and metal salts.

The source of titanium or titanium and at least one other metal capable of being octahedrally coordinated is added as an aqueous solution from which said titanium or titanium and said other metal precipitate in said reaction mixture.

As is known in the field of inorganic chemistry, in order for a metal capable of being octahedrally coordinated to be octahedrally coordinated in solution, it is usually necessary that it be in an acidic environment. If the titanium, and any other octahedrally coordinated metal or metals, is associated with small monovalent anions, e.g., chloride or oxychloride, then it must be at a pH less than 2, preferably less than 1 and more preferably less than 0.5 prior to adding the same to the alkaline medium. If the metals associated with said small monovalent anions are not at these pH levels, crystallization of the synthesis gel will not result in a large-pored zeolite, i.e., one having a pore size of at least 8 Angstrom units.

Anions as large as isopropoxide, sulfate or phosphate interfere with the polymerization of octahedral chains which is believed necessary to the formation of the large-pored sieves of this invention. Polyvalent anions can be used provided they are of such a size that will not interfere in the formation of octahedral chains. Thus, the expression "small anion" is intended to mean anions having a size smaller than isopropoxide or sulfate.

As has heretofore been stated, if titanium and another metal are both desired to be octahedrally coordinated in the framework structure, they must be together at the point of precipitation, i.e., they ust coprecipitate in at least a portion of the reaction mixture.

The simplest way of insuring that titanium and any other octahedrally coordinated metal coprecipitate is to have them both in the same solution.

The source of metal which is octahedrally coordinated can be an appropriate metal salt of small diameter such as nitrates, fluorides, chlorides and oxychlorides, with the chloride being preferred. As previously indicated, large anions such as sulfates, phosphates or isopropoxides are simply not operable.

If the titanium or other metal desired to be in the octahedrally coordinated state is present in solution at a pH which is too high, a halogen acid, such as hydrochloric, hydrobromic, hydroiodic, hydrofluoric and perchloric must be added.

For reasons which are not completely understood, organic acids or other mineral acids, such as sulfuric or nitric, are not as effective. It appears that these acids adversely affect the growth of SiO$_2$ linkages. Thus, an acid must be used which does not adversely affect the growth of SiO$_2$ chains and halogen acids are admirably suited.

For reasons which are not completely understood, it is often desirable to add acid even when the pH is less than 2 in order to absolutely insure that as much of the metals as possible are in the octahedral state in solution.

Extensive studies with traditional organic templating agents, such as those typically employed in the synthesis of ZSM-5 type zeolites (see U.S. Pat. No. 4,707,345), as well as non-traditional organic templating agents, such as multivalent or metallic bipyrridyl complexes, added to the synthesis mixtures which would yield the large-pore molecular sieve zeolites without said template addition uniformly resulted in the formation of layered structures or small-pored molecular sieves and not the large-pored molecular sieves of this invention.

It is believed that this is the result of these organic templates interfering with the octahedral chain formation necessary to produce the instant molecular sieve zeolite. Thus, organic templates cannot be present at the point of precipitation of titanium or coprecipitation of titanium and another metal.

Finally, there must be present in the forming solution sufficient or alkaline earth metal cations to properly coordinate and the octahedral chains. In this connection, be present at least 2 cations of alkali metals (which have a valence of 1+) and/or at least 1 cation of alkaline earth metal (which has a valence of 2+) for each atom of octahedrally coordinated metal. If this condition is not met, the large-pored zeolites of the invention will not be obtained.

Quite obviously, there must be present sufficient cations to fulfill the formula set forth on page 8.

As a practical matter, it is preferred to operate at cation levels in the forming solution which are from 2 to 20 times the amount required by the formula set forth on page 8.

The reaction mixture is heated to a temperature of from about 75° C. to 250° C. for a period of time ranging from about 2 hours to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. The preferred temperature rang is 150° C. to 225° C. for a period of time ranging from 4 hours to 7 days. Crystallization is performed in a continuous or batchwise manner under autogenous pressure in an autoclave or static bomb reactor. Following the water washing step, the crystalline molecular sieve is dried at temperatures of 40° to 325° C. for periods up to 30 hours.

It is to be understood that prior to crystallization, the gel resulting from the reaction mixture can be subjected to one or more thermal treatments at temperatures of from about 50° C. to 800° C. for 1–48 hours. The thermally treated gel may be mixed with water and crystallized.

Quite obviously, it is possible to use less caustic or other reactants in the gel than set forth in Table 3 and supply these during the crystallization step after the gel has been thermally treated.

The source of metal which is tetrahedrally coordinated is preferably the appropriate metal salt such as nitrate, fluoride, chloride, etc., as well as solid sources of soluble metals.

The anions which are associated with the metal desired to be tetrahedrally incorporated in the framework are not as critical as the anions which are associated with the tetrahedral metal. It is absolutely crucial that anions which would otherwise be harmful to the octahedral titanium be excluded from titanium until the titanium has precipitated in at least a portion of the reaction mixture. Thus, for example, if one were to take an acidic solution of titanium tetrachloride and precipitate it into an alkaline silicate solution, then an anion such as sulfate, which would otherwise interfere with titanium, can be used in the form of its tetrahedral metal salt.

Notwithstanding the above, it is particularly preferred that the same constraints with regard to the anion which are associated with the octahedral metal be followed in connection with the tetrahedrally coordinated metal in order to insure that there be no interference in the formation of the novel large-pore size molecular sieve zeolites of this invention.

The source of alkalinity is preferably an aqueous solution of an alkali metal hydroxide, such as sodium hydroxide, which provides a source of alkali metal ions for maintaining electrovalent neutrality and controlling the "pH" of the reaction mixture within the range of about 8.5 to 13.0 using the technique elaborated in U.S. Pat. No. 4,853,202. The alkali metal hydroxide serves as a source of both cations and hydroxyl. All or a portion of the cations and the hydroxyl can be supplied by an aqueous solution of an alkali metal silicate, for example, sodium silicate.

As can be seen from the above, the titanium and other octahedrally coordinated metals experience a sharp pH swing. These metals go from an acidic "pH" to a "pH" of 8.5–13.0 in the synthesis gel. The "pH" of the synthesis gel is critical and it varies depending on the specific metal in the synthesis gel. However, this variation is generally within a "pH" of 8.5–13.0.

It is to be clearly understood that the pH of the synthesis gel is very critical in synthesizing the large-pored molecular sieves of this invention. As has been pointed out, the "pH" varies depending on the specific synthesis gel but it is between 8.5–13.0. This does not mean that an individual wide pored zeolite can be synthesized over the entire "pH" range but, rather, that somewhere between "pH" 8.5–13.0 there is a "pH" range that is specific for the particular zeolite being crystallized. The proper "pH" for a specific zeolite can easily be determined by routine experimentation.

If any one of the critical conditions is lacking, the large-pored zeolites of this invention will not be obtained. Thus, Example 13 of U.S. Pat. No. 4,707,345 prepares a zeolite from a source of titanium, silica, base and organic template. This Example does not result in the production of the novel wide-pored zeolites of this invention for many reasons, including the fact that the cation balance is too low, i.e., 3.6 mols of TPABr, plus 14 moles of NaOH, equal 17.6 moles per 15 moles of titanium. This does not meet the 2 to 1 minimum. Additionally, titanium isopropoxide was used and an organic template was used, thereby precluding the formation of the large-pored molecular sieve zeolites of this invention.

Example 19 of the same patent presents a repeat of an example in a European patent application. This example does have the proper cation balance but did not insure the presence of octahedral titanium because of the presence of an organic templating agent. As can be seen, only a ZSM-5 type zeolite was produced with no detectable titanium (col. 17, lines 30–32).

While not wishing to be bound by any theory of operation, it appears that titanium is critical since it polymerizes to form chains and unexpectedly serves to copolymerize the other octahedrally coordinated metal or metals into chains which can then interact with silica to form the novel large-pored zeolites of this invention.

The crystalline molecular sieve as synthesized can have the original components thereof replaced by a wide variety of others according to techniques well known in the art. Typical replacing components would include hydrogen, ammonium, alkyl ammonium and aryl ammonium and metals, including mixtures of the same. The hydrogen form may be prepared, for example, by substitution of original sodium with ammonium or by the use of a weak acid. The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

The crystalline molecular sieves are then preferably washed with water and dried at a temperature ranging from about 100° F. to about 600° F. and thereafter calcined in air or other inert gas at temperatures ranging from 500° F. to 1500° F. for periods of time ranging from 1/2 to 48 hours or more.

Regardless of the synthesized form of the molecular sieves, the spatial arrangement of atoms which form the basic crystal lattices remain essentially unchanged by the replacement of sodium or other alkali or alkaline earth metal or by the presence in the initial reaction mixture of metals in addition to sodium, as determined by an X-ray powder diffraction pattern of the resulting molecular sieves. The X-ray diffraction patterns of such products are essentially the same as those set forth in Table 2 above (with the exception that the 7.20±0.15 Å line is sometimes not observed).

The crystalline molecular sieves prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The composition can be extruded before drying or dried or partially dried and then extruded.

Sometimes, it is desired to incorporate the new crystalline molecular sieves with another material resistant to the temperatures and other conditions employed during use. Such materials include active and inactive materials and synthetic and naturally occurring zeolites as well as inorganic materials such as clays, silica and/or metal oxides. The latter may be either naturally occurring or in the form of gelatinous precipitates or gels including mixtures of silica and metal oxides. Use of an active material in conjunction with the new molecular sieves tends to improve the conversion and/or selectivity of the catalyst in certain organic conversion processes. Inactive materials suitably serve as diluents to control the amount of conversion in a given process so that products can be obtained economically and in an orderly manner without employing other means for controlling the rate of reaction. Normally, crystalline materials have been incorporated into naturally occurring clays, e.g., bentonite and kaolin to improve the crush strength when employed as a catalyst under commercial operating conditions such as hydrocarbon conversion. These materials, i.e., clays, oxides, cements, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline molecular sieves described herein include the smectite and kaolin families, which families include the montmorillonites such as sub-bentonites and the kaolins in which the main constituent is kaolinite, halloysite, dickite, nacrite or anauxite. Such clays can be used in the raw state after conventional gritting or they can be subjected to additional processing such as calcination, acid treatment or chemical modification.

In addition to the foregoing materials, the crystalline molecular sieves may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline metal organosilicate and inorganic oxide gel matrix can vary widely with the crystalline organosilicate content ranging from about 1 to 90 percent by weight and more usually in the range of about 2 to about 50 percent by weight of the composite.

As is known in the art, it is often desirable to limit the alkali metal content of materials used for acid catalyzed reactions. This is usually accomplished by ion-exchange with hydrogen ions or precursors thereof such as ammonium and/or metal cations such as rare earth.

Employing the catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the family of molecular sieves of this invention containing a hydrogenation component, reforming stocks can be reformed employing a temperature between 700° F. and 1000° F. The pressure can be between 100 and 1,000 psig, but is preferably between 200 to 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins when provided with a hydrogenation component, e.g., platinum. Hydroisomerization is carried out at a temperature between 200° and 700° F., preferably 300° F. to 550° F., with a liquid hourly space velocity between 0.01 and 2, preferably between 0.25 and 0.50 employing hydrogen such that the hydrogen to hydrocarbon mole ratio is between the 1:1 and the 5:1. Additionally, the catalyst can be used for olefin isomerization employing temperatures between 30° F. and 500° F.

In order to more fully illustrate the nature of the invention and a manner of practicing the same, the following examples illustrate the best mode now contemplated. It is to be understood that unless otherwise specified, the "pH" of the synthesis gel in all examples ranged from 10–12 and the d spacings are in Angstrom units.

All the syntheses were carried out in teflon-lined autoclaves.

EXAMPLE 1

In octahedral coordination, Zr(IV) is somewhat larger than Ti(IV). A solution of $TiCl_3$ and $ZrCl_4$ having a "pH" less than 2 was prepared such that $Zr/Ti=1$ and $Zr+Ti=1.06$ molar in 20 wt. % HCl. An alkaline silicate mixture was prepared by blending 1,758.4g of "N"-Brand sodium silicate with 252g of NaOH and 112.4g of KF. 163.2g of the mixed metal solution was added to 312.8 g of said alkaline silicate mixture and thoroughly blended causing the titanium and zirconium to precipitate from solution forming a gel. This gel was analogous to a "standard" ETS-10 gel with Zr replacing ½ of Ti. A portion of the gel was autoclaved under autogenous pressure for 48 hours at 200° C. A white crystalline product was obtained with an XRD pattern greatly resembling ETS-10 although somewhat upshifted because of the incorporation of both octahedral titanium and octahedral zirconium in the framework. 1 The cation ratio, i.e., $Na+K+$ to $Zr+Ti$ was 11.6.

|  | ETS-10 | ETS-10 MIXTURE WITH Zr PRESENT |
|---|---|---|
| Largest d-spacing | 14.6–14.7 | 14.85 |
| Strongest | 3.60 | 3.62 |

While not profound, these shifts are outside normal analytical error and indicate some degree of zirconium incorporation.

The pore size of the molecular sieve of this Example was determined to be 8.2 Angstrom units based on the lead XRD peak position and structural modeling of ETS-10.

EXAMPLE 2

In tetrahedral coordination, Ga(III) is larger than Si(IV) or Al(III). A solution of $TiCl_3$ and $GaCl_3$ having a "pH" of less than 2 was prepared such that Ga/Ti=0.5 and Ga+Ti=1.45 molar in 20 wt. % HCl. An alkaline silicate solution was prepared by blending 100.5 g of "N"-Brand sodium silicate solution with 21.0 g NaOH and 9.5 g anhydrous KF. The Ti+Ga solution was mixed and added to the alkaline silicate solution and thoroughly blended causing precipitation of the titanium and gallium and the "pH" was found to be 10.2. To the mixture a solution containing 3.0 g of NaOH in 4.9 g D.I. water was added and thoroughly blended in order to elevate the "pH" which was then found to be about 10.6. To the mixture was added 0.93 g of calcined ETS-10 as seeds. A 15 gram portion of the mixture was autoclaved under autogenous pressure at 200° C. for 24 hours.

A crystalline product was obtained containing octahedrally coordinated titanium and tetrahedrally coordinated gallium and silicon in the framework with an XRD pattern greatly resembling ETS-10, although somewhat upshifted.

The pore size determined as in Example 1 was 8.3 Angstrom units and the cation ratio was 8.7.

|  | ETS-10 | ETS-10 MIXTURE WITH Ga PRESENT |
|---|---|---|
| Largest d-spacing | 14.6–14.7 | 14.95 |
| Strongest d-spacing | 3.60 | 3.62 |

As with the octahedral substitution of atoms larger than titanium, the substitution of tetrahedral atoms larger than silicon is seen to "expand" the lattice parameters of ETS-10-type structures.

EXAMPLE 3

Ce(IV) is larger than Zr(IV) in octahedral coordination and significantly larger than Ti(IV). Framework incorporation would be expected to yield more pronounced upshifts than zirconium.

Example 1 was repeated with the exception that $CeCl_3$ was directly substituted for $ZrCl_4$ on a mole per mole basis in the mixed metal solution.

The cation ratio was 11.6.

The pore size determined as in Example 1 was 8.6 Angstrom units.

A crystalline product was obtained which contained multiple phases, one of which greatly resembled ETS-10, but with a pronounced upshift in XRD peak positions attributed to octahedral cerium and titanium and tetrahedral silicon in the framework.

|  | ETS-10 | ETS-10 MIXTURE WITH Ce PRESENT |
|---|---|---|
| Largest d-spacing | 14.6–14.7 | 15.2 |
| Strongest d-spacing | 3.60 | 3.69 |

These upshifts are pronounced. It is unmistakable that substantial cerium incorporation has occurred in an ETS-10-like crystalline lattice.

EXAMPLE 4

While Examples 1 and 3 demonstrate that atoms which essentially always occur in octahedral coordination in oxides and therefore presumably substitute for octahedral titanium, can be incorporated into ETS-10-like materials, it was decided to test the hypothesis that the noted expansion of lattice planes was occurring by a totally different mechanism than the expansion observed during aluminum incorporation in ETAS-10. If these two expansions were independent, then their effect might well be additive.

To a portion of the remaining gel of Example 1 was added $NaAlO_2$ such that Al/(Ti+Zr)=0.5. This is empirically equivalent to Example 5 of Ser. No. 07/373,855 (ETAS-10) with Zr substituting for ¼ of the Ti. Eight gram samples were fortified with varying additions of caustic to accelerate growth. With the addition of approximately 0.35 grams of NaOH to an eight gram charge, a crystalline product resulted which resembled ETAS-10 but with clearly upshifted XRD d-spacings due to octahedral titanium and zirconium and tetrahedral silicon and aluminum in the framework.

The cation ratio is 12.2.

The pore size determined as in Example 1 was 8.7 Angstrom units.

|  | ETS-10 | EXAMPLE 1 | ETAS-10 (Al/Ti = .5) | EXAMPLE 4 |
|---|---|---|---|---|
| Largest d-spacing | 14.6–14.7 | 14.85 | 14.9–15.0 | 15.3 |
| Strongest d-spacing | 3.60 | 3.62 | 3.63–3.64 | 3.70 |

Not only are the lattice expansions additive, it appears that the two mechanisms act synergistically. This can be rationalized by aluminum "relaxing" mixed Ti/Zr chains to a higher degree than less constricted pure Ti(IV) chains.

EXAMPLE 5

To a portion of the remaining gel of Example 3 was added $NaAlO_2$ such that Al/(Ti+Ce)=0.5. This is empirically equivalent to Example 5 of Ser. No. 07/529,021 with Ce substituting for ¼ of the Ti. Eight gram samples were fortified with varying additions of caustic to accelerate growth. With the addition of approximately 0.25 grams of NaOH to an eight gram charge, a mixed phase crystalline product resulted a substantial portion f which resembled ETAS-10 but with XRD d-spacings upshifted still further beyond the previous examples due to octahedral cerium and titanium and tetrahedral silicon and aluminum in the framework.

The cation ratio was 12.2.

The pore size determined as in Example 1 was 8.8 Angstrom units.

|  | ETS-10 | EXAMPLE 3 | ETAS-10 (Al/Ti = .5) | EXAMPLE 5 |
|---|---|---|---|---|
| Largest d-spacing | 14.6–14.7 | 15.2 | 14.9–15.0 | 15.45 |
| Strongest d-spacing | 3.60 | 3.69 | 3.63–3.64 | 3.78 |

Again, the effects of both cerium and aluminum substitution are apparent in lattice expansion. In the case of the strongest peak, an apparent synergy is noted as in the previous example.

EXAMPLE 6

Cr(III) is insignificantly larger than Ti(IV). A preparation similar to Example 5 of Ser. No. 07/529,021 was prepared with CrCl$_3$ replacing the aluminum source on an equivalent molar basis.

An alkaline silicate solution was prepared from the following reactants:
502.4 g "N"-Brand sodium-silicate
105.0 g NaOH
46.4 g KF (anhydrous)
A mixed Cr/Ti solution was prepared from the following reactants:
326.4 g Fisher TiCl$_3$ solution (20% in Acid)
46.4 g CrCl$_3$·6H$_2$O The mixed Cr/Ti solution was added to the alkaline solution and thoroughly blended using an overhead stirrer causing coprecipitation of the chromium and titanium and to the resultant gel was added 4g calcined ETS-10 seed crystals.

The seeded chromium-titanium-aluminum-silicate reactant mixture was autoclaved under autogenous pressure for 24 hours at 200° C. In this example, the Cr/Ti ratio in the reactant mixture was prepared to be 1:2. A highly crystalline product was obtained whose air-equilibrated d-spacings corresponding to those of ETS-10.

The cation ratio was 9.5.

The pore size determined as in Example 1 was 8.0 Angstrom units.

|  | ETS 10 | ETS-10 MIXTURE WITH Cr PRESENT |
|---|---|---|
| Largest d-spacing | 14.6–14.7 | 14.6–14.7 |
| Strongest | 3.60 | 3.60 |

The highly crystalline product of this Example was analyzed by standard wet chemical procedures. The elemental composition and that of ETS-10 are presented below:

|  | ETS-10 | | ETS-10-LIKE PHASE WITH OCTAHEDRAL CR(III) SUBSTANTIALLY SUBSTITUTING FOR TI(IV) | |
|---|---|---|---|---|
|  | OXIDE WT. % | MMOLES/ GM | OXIDE WT. % | MMOLES/ GM |
| Si | 61.4 | 9.0 | 58.9 | 8.5 |
| Ti | 22.7 | 2.5 | 13.0 | 1.4 |
| Cr | — | — | 7.1 | 0.8 |
| Na | 13.8 | 3.9 | 13.2 | 3.7 |
| K | 3.1 | 0.6 | 7.8 | 1.4 |
| Si/Ti |  | 3.6 |  | 6.0 |
| Si/(Ti + Cr) |  | 3.6 |  | 3.8 |

In ETS-10 the ratio Na+K/2Ti is For the chromium substituted material (Na+K)/(2Ti+3Cr)=0.97. Charge balance is only possible if chromium induces a triply charged site. If chromium(III) was simply the cation in standard ETS-10 (Na+K+3Cr)/2Ti would equal unity. The suppression of the titanium content in this highly pure phase as well as the equivalence of Si/(Cr+Ti) in comparison to Si/Ti in ETS-10 leave essentially no doubt that direct substitution of octahedral chromium for titanium has occurred and a triply charged octahedral Cr(III) site generated.

EXAMPLE 7

In some cases, the substitution of species other than octahedral titanium or tetrahedral silicon or aluminum in ETS-10 and ETAS-10 structures can be hard to pinpoint from a coordination perspective, although some substitution has clearly occurred. A case in point is niobium wherein tetrahedral Nb(III) or octahedral Nb(V) or mixtures thereof would appear identical from a charge balance perspective.

An alkaline silicate solution was prepared from the following reactants:
124.00 g sodium disilicate solution (SDS)
42.60 g NaOH
10.45 g KF (anhydrous)
8.44 g D.I. H$_2$O
A mixed Nb/Ti/Al solution with a Ti:Nb:Al ratio of 1:1:1 was prepared from the following reactants:
10.65 g TiCl$_4$
15 20 g NbCl$_5$
13.56 g AlCl$_3$·6H$_2$O
46.40 g conc. HCl
0.63 g D.I. H$_2$O The mixed Nb/Ti/Al solution was added to the alkaline silicate causing precipitation and were thoroughly blended using an overhead stirrer and to the resultant gel was added 4 g calcined ETS-10 seed crystals. The "pH" of the resultant gel was 11.6 by our standard dilution method.

Eight grams of the niobium-titanium-aluminum-silicate reactant mixture was mixed with 0.21 g sodium aluminate and 1.79 g D.I. H$_2$O and autoclaved under autogenous pressure for 7 days at 200° C.

The cation ratio was 16.2.

Pore size determined as in Example 1 was 9.2 Angstrom units.

A highly crystalline product was obtained whose air-equilibrated d-spacings are the following:

|  | ETS 10 | ETS-10 MIXTURE WITH Nb and Al PRESENT |
|---|---|---|
| Largest d-spacing | 14.6–14.7 | 15.8 |
| Strongest d-spacing | 3.60 | 3.62 |

EXAMPLE 8

Other synthesis techniques may also be employed that result in larger lattice expansions and presumable higher levels of metal incorporation. One such technique was employed as follows for the incorporation of niobium.

An alkaline silicate solution was prepared from the following reactants:
1116.0 g sodium disilicate solution (SDS)
318.8 g NaOH
83.6 g KF (anhydrous)
A mixed Nb/Ti/Al solution with a Ti:Nb:Al ratio of 1:1:1 was prepared from the following reactants:
85.2 g TiCl$_4$
121.4 g NbCl$_5$
108.5 g AlCl$_3$·6H$_2$O
371.1 g conc. HCl
5.0 g D.I. H$_2$O The mixed Nb/Ti/Al solution was added to the alkaline silicate causing precipitation and were thoroughly blended using an overhead stirrer and to the resultant gel was added 10.0 g calcined ETS-10 seed crystals. The "pH" of the resultant gel was 11.6 by our standard dilution method and the cation balance was 16.2.

Pore size determined as in Example 1 was 9.7 Angstrom units.

The niobium-titanium-aluminum-silicate reactant mixture was placed in a steel tray and dried at 200° C. The dried product was ground to a fine powder and calcined at 500° C. for 2 hours. Four grams of the calcined gel was mixed with 6 grams of D.I. $H_2O$ and autoclaved for 4 days at 200° C. A highly crystalline product was obtained whose air-equilibrated d-spacings are the following:

|  | ETS 10 | ETS-10 MIXTURE WITH Nb and Al PRESENT |
|---|---|---|
| Largest d-spacing | 14.6–14.7 | 16.3 |
| Strongest d-spacing | 3.60 | 3.62 |

The reason for the profound shift of the lead d-spacing while the strongest peak is only mildly upshifted is not yet known.

EXAMPLE 9

The niobium-titanium-aluminum-silicate gel similar to that of Example 7 was prepared and crystallized for 6 days at 200° C. The crystalline product was boiled in a 1.0 wt. % NaOH solution for 30 minutes to dissolve amorphous contaminants and subjected to elemental analysis by XRD. Analysis revealed:

|  | ETS-10 | | ETS-10-LIKE PHASE WITH NIOBIUM AND ALUMINUM INCORPORATION | |
|---|---|---|---|---|
|  | OXIDE WT. % | MMOLES/ GM | OXIDE WT. % | MMOLES/ GM |
| Si | 61.4 | 9.0 | 36.4 | 5.2 |
| Ti | 22.7 | 2.5 | 13.2 | 1.4 |
| Nb | — | — | 19.2 | 1.2 |
| Al | 0.3 | 0.0 | 8.9 | 1.5 |
| Na | 13.8 | 3.9 | 20.1 | 5.6 |
| K | 3.1 | 0.6 | 1.2 | 0.2 |
| Si/Ti |  | 3.6 |  | 3.7 |
| Ti/Nb |  | — |  | 1.2 |
| (Si + Al)/ (Ti + Nb) |  | 3.6 |  | 2.6 |

In ETS-10 the ratio Na+K/2Ti is approximately 1. For the niobium/aluminum substituted material (Na+K)/(2Ti+Nb+Al)=1.04. It is clear that each niobium induces one framework charge although it is unclear whether this represents all octahedral Nb(V) or whether some of the niobium is present as tetrahedral Nb(III). Irrespective of the above, the composition still falls within the formula set forth on page 8 for mole ratio of oxides.

It is noted that the novel large-pore molecular sieve zeolites of this invention include non-preferred compositions where the same metal is present in the framework in both octahedrally and tetrahedrally coordinated sites.

Compositions of this type can be prepared in one of two general ways.

In the first method, when a metal other than titanium is desired to be in the octahedral state and precautions are taken to co-precipitate the two metals in at least a portion of the reaction mixture, the simple fact remains that it is not possible to insure that 100% of the metal other than titanium would be in the octahedral state. Thus, inherently, a molecular sieve would be prepared wherein a portion of the metal other than titanium was in both the octahedral state and in the tetrahedral state. Quite obviously, the portion of the metal in the octahedral state would be higher than the proportion of metal in the tetrahedral state by following the precautions set forth in the specification.

In a second method, in order to insure that more of the metal other than titanium was in the tetrahedral state, following the precipitation of the titanium and the other metal in the reaction mixture, a solution of the same metal can be added to the reaction mixture and then synthesized into large-pored molecular sieves.

CONCLUSIONS

We have demonstrated that octahedral atoms other than titanium may be incorporated into ETS-10-like structures. If the substituted atoms are larger than Ti(IV), a lattice expansion results. The lattice defines the crystalline pores of the sieve and with lattice expansion, pore expansion is intuitively obvious. We have demonstrated that this expansion may act additively with lattice expansions induced by appropriate tetrahedral substitutions. In fact, there is reason to believe that a synergistic effect may exist between certain pairs of octahedral and tetrahedral substitutions in ETS-10-like structures as larger octahedral atoms expand octahedral chains and larger tetrahedral "binding" atoms allow the constrained chains to "relax" to a higher degree.

The lattice expansions of Examples 3, 4, 5, 7 and 8 are of significant magnitude. There is little doubt that the pores of these materials are substantially larger than the 8–9 Angstrom units of ETS-10.

Other molecular sieves can be prepared in a similar manner by using titanium and at least one octahedrally coordinated metal and/or appropriate salts of tetrahedrally coordinated metals.

GLOSSARY OF TERMS

Definitions, Procedures and Reactants Employed $N^R$ Brand Sodium Silicate is a commercial solution obtained from PQ Corporation. Typical lot analysis would include approximately 29 wt. % $SiO_2$ and 9 wt. % caustic as $Na_2O$, the balance being water.

SDS (sodium di-silicate) is a commercially used sodium silicate solution in Engelhard FCC operations and was obtained internally. Typically lot analysis would include approximately 27 wt. % $SiO_2$ and 14 wt. % caustic as $Na_2O$, the balance being water.

Potassium fluoride (KF) was obtained on an anhydrous basis from Pfaltz and Bauer, Inc. Solubility of fluorides in the silicate solutions employed is such that they are only partially dissolved upon mixing, the balance appearing suspended in the silicate mixtures.

Caustic (NaOH) was obtained as an essentially anhydrous material from Fisher Scientific.

Titanous Chloride solution ($TiCl_3$) was obtained from Fisher Scientific as 20 wt. % $TiCl_3$ in 20 wt. % HCl, the balance being water yielding a net molality of 1.25–1.30 $TiCl_3$.

Titanium tetrachloride ($TiCl_4$) was obtained as a +99 wt. % liquid from Alfa-Ventron.

Aluminum trichloride as the hexa-aquated salt (AlCl$_3$·6-H$_2$O) was obtained from Fisher Scientific. The aluminum trichloride is completely dissolved in the titanous chloride solution before the mixed metal solution is blended into alkaline silicate mixtures.

Sodium aluminate (NaAlO$_2$) was obtained on an essentially anhydrous basis from Pfaltz and Bauer Inc. Where this reactant is employed as the aluminum source, sodium aluminate is added as a solid to freshly prepared titanium silicate gels and blended until it apparently dissolves.

Thoroughly blended refers to gels which have been stirred by overhead stirrers to the point where they visually appear homogeneous. All blending is done at ambient temperature although acid base reactions and base dissolution may temporarily elevate the temperature of the gel.

All products of the examples are vacuum filtered, washed with an excess of deionized water (at least 10 cc/g) and dried at 200° C. for at least 30 minutes prior to any further treatment or testing.

Air-equilibration is carried out by exposure of dried samples to ambient air for a period of at least one hour.

Elemental analyses are presented on a volatile free basis as determined by x-ray fluorescence unless otherwise indicated. The x-ray fluorescence sample preparation technique used involves exposure to elevated temperature—typically 1100° C.

Octahedral coordination—A condition occurring when the metal shares 6 oxygen atoms which impart a charge of $-12/2 = -6$. Ti (IV), for example, imparts a charge of $+4$ such that the charge is $-2$.

Tetrahedral coordination—A condition occurring when the metal shares 4 oxygen atoms which impart a charge of $-8/2 = 4$. Al (III), for example, imparts a charge of $+3$ such that the coordinated aluminum center bears a net charge of $-1$. On the other hand, a metal with a valence of $+4$ such as silicon incurred a result in a net charge of $(-4+4)$ or zero.

Pore Size—is defined as the kinetic diameter of a particular molecular sieve determined by measuring its ability to absorb (5 wt. % or greater) quantities of certain molecules of known molecular dimension from the gas phase after activation at 150° C. or above. Thus, toluene is known to have a molecular dimension of about 6-7 angstrom units, triethylamine about 8 angstrom units and 1,3,5-triisopropyl benzene about 10 angstrom units. Alternatively, the pore can be determined based on structural modeling of ETS-10 (which has a known pore size determined by said absorption) and measuring the XRD peak positions.

What is claimed is:

1. A crystalline molecular sieve having a pore size of at least 8 Angstrom units and having a composition consisting of in terms of mole ratios of oxide as follows:

$a (1.0\pm0.25)M_{2/n}O:XO_a:dZO_\beta:0-100 H_2O$ wherein X is octahedrally coordinated titanium alone or a mixture of octahedrally coordinated titanium and another octahedrally coordinated metal selected from the group consisting of arsenic, cobalt, chromium, copper, iron, germanium, hafnium, magnesium, manganese, molybdenum, niobium, nickel, antimony, tin, uranium, vanadium, yttrium, zinc, zirconium, lanthanum, an actinide and a lanthanide and mixtures thereof; Z is silicon and another metal selected from the group consisting of aluminum, arsenic, bismuth, boron, beryllium, cobalt, chromium, copper, iron, gallium, germanium, indium, lead, magnesium, manganese, molybdenum, niobium, nickel, antimony, tin, titanium, vanadium, tungsten, zinc, and mixtures thereof; M is at least one cation of valence n; $\alpha$ is ½ the valence of X; $\beta$ is ½ the valence of Z; d is 2-100; a is equal to ½ the charge provided by the total of X and Z with the proviso that when X is solely titanium, Z cannot be solely silicon or silicon plus aluminum.

2. A crystalline molecular sieve according to claim 1 wherein d is 2-20.

3. A crystalline molecular sieve according to claim 1 wherein d is 2-10.

4. A crystalline molecular sieve according to claim 1 wherein X comprises titanium.

5. A crystalline molecular sieve according to claim 1 wherein X comprises zirconium and titanium.

6. A crystalline molecular sieve according to claim 1 wherein X comprises chromium and titanium.

7. The composition of claim 5 wherein Z comprises silicon.

8. The composition of claim 5 wherein Z comprises silicon and aluminum.

9. The composition of claim 4 wherein Z comprises gallium and silicon.

10. The composition of claim 6 wherein Z comprises silicon.

11. A crystalline molecular sieve according to claim 1 wherein Z comprises gallium.

12. The composition of claim 1 wherein M is a mixture of sodium and potassium.

13. The composition of claim 1 wherein M comprises hydrogen.

14. The composition of claim 1 wherein M comprises rare earth.

15. A crystalline molecular sieve according to claim 1 wherein X comprises cerium and titanium.

16. The composition of claim 15 wherein Z comprises silicon.

17. The composition of claim 15 wherein Z comprises silicon and aluminum.

18. A crystalline molecular sieve according to claim 1 characterized by having an X-ray diffraction pattern as set forth in Table 2 of the specification.

19. A crystalline molecular sieve according to claim 2 characterized by having an X-ray diffraction pattern as set forth in Table 2 of the specification.

20. A crystalline molecular sieve according to claim 3 characterized by having an X-ray diffraction pattern as set forth in Table 2 of the specification.

21. A crystalline molecular sieve according to claim 4 characterized by having an X-ray diffraction pattern as set forth in Table 2 of the specification.

22. A crystalline molecular sieve according to claim 5 characterized by having an X-ray diffraction pattern as set forth in Table 2 of the specification.

23. A crystalline molecular sieve according to claim 6 characterized by having an X-ray diffraction pattern as set forth in Table 2 of the specification.

24. A crystalline molecular sieve according to claim 7 characterized by having an X-ray diffraction pattern as set forth in Table 2 of the specification.

25. A crystalline molecular sieve according to claim 8 characterized by having an X-ray diffraction pattern as set forth in Table 2 of the specification.

26. A crystalline molecular sieve according to claim 9 characterized by having an X-ray diffraction pattern as set forth in Table 2 of the specification.

27. A crystalline molecular sieve according to claim 10 characterized by having an X-ray diffraction pattern as set forth in Table 2 of the specification.

28. A crystalline molecular sieve according to claim characterized by having an X-ray diffraction pattern as set forth in Table 2 of the specification.

29. A crystalline molecular sieve according to claim characterized by having an X-ray diffraction pattern as set forth in Table 2 of the specification.

30. A crystalline molecular sieve according to claim characterized by having an X-ray diffraction pattern as set forth in Table 2 of the specification.

31. A crystalline molecular sieve according to claim 14 characterized by having an X-ray diffraction pattern as set forth in Table 2 of the specification.

32. A crystalline molecular sieve according to claim 15 characterized by having an X-ray diffraction pattern as set forth in Table 2 of the specification.

33. A crystalline molecular sieve according to claim 16 characterized by having an X-ray diffraction pattern as set forth in Table 2 of the specification.

34. A crystalline molecular sieve according to claim 17 characterized by having an X-ray diffraction pattern as set forth in Table 2 of the specification.

35. A process for conversion of an organic compound which comprises contacting the same at conversion conditions with the composition of claim 1.

36. A process for catalytic cracking of hydrocarbon which comprises contacting the same with the composition of claim 1 at elevated temperatures.

37. A process for reforming a naphtha which comprises contacting the same in the presence of added hydrogen and a hydrogenation/dehydrogenation component with the composition of claim 10.

38. A process for reforming a naphtha which comprises contacting the same in the presence of added hydrogen and a hydrogenation/dehydrogenation component with the composition of claim 11.

39. A process for the removal of divalent ions from a solution containing the same which comprises contacting said solution with the composition of claim 1.

40. A process for the removal of polyvalent ions from a solution containing the same which comprises contacting said solution with the composition of claim 2.

41. A process for the removal of polyvalent ions from a solution containing the same which comprises contacting said solution with the composition of claim 3.

42. A process for the removal of polyvalent ions from a solution containing the same which comprises contacting said solution with the composition of claim 11.

43. The process of claim 28 wherein the polyvalent ion is $Pb^{+2}$.

44. A process for conversion of an organic compound which comprises contacting the same at conversion conditions with the composition of claim 12.

45. A process for catalytic cracking of hydrocarbon which comprises contacting the same with the composition of claim 20 at elevated temperatures.

46. A process for reforming a naphtha which comprises contacting the same in the presence of added hydrogen and a hydrogenation/dehydrogenation component with the composition of claim 20.

47. A process for reforming a naphtha which comprises contacting the same in the presence of added hydrogen and a hydrogenation/dehydrogenation component with the composition of claim 20.

48. A process for the removal of polyvalent ions from a solution containing the same which comprises contacting said solution with the composition of claim 18.

49. A process for the removal of polyvalent ions from a solution containing the same which comprises contacting said solution with the composition of claim 20.

50. A process for the removal of polyvalent ions from a solution containing the same which comprises contacting said solution with the composition of claim 20.

51. The process of claim 47 wherein the polyvalent ion is $Pb^{+2}$.

52. The process of claim 48 wherein the polyvalent ion is $Pb^{+2}$.

53. The process of claim 49 wherein the polyvalent ion is $Pb^{+2}$.

54. The crystalline molecular sieve according to claim 1 wherein said actinide is uranium.

55. The crystalline molecular sieve according to claim 1 wherein said lanthanide is cerium.

* * * * *